(12) United States Patent
Sugawara

(10) Patent No.: US 7,666,966 B2
(45) Date of Patent: Feb. 23, 2010

(54) METHOD OF MANUFACTURING THERMOPLASTIC RESIN, CROSSLINKED RESIN, AND CROSSLINKED RESIN COMPOSITE MATERIAL

(75) Inventor: Tomoo Sugawara, Tokyo (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 11/783,705

(22) Filed: Apr. 11, 2007

(65) Prior Publication Data
US 2007/0191563 A1    Aug. 16, 2007

Related U.S. Application Data

(62) Division of application No. 10/519,228, filed as application No. PCT/JP03/08105 on Jun. 26, 2003, now Pat. No. 7,476,716.

(30) Foreign Application Priority Data

| Jun. 28, 2002 | (JP) | ............................. 2002-190929 |
| Jul. 29, 2002 | (JP) | ............................. 2002-219255 |
| Jan. 20, 2003 | (JP) | ............................. 2003-10967 |

(51) Int. Cl.
- C08G 61/08   (2006.01)
- C08F 2/02    (2006.01)
- B32B 15/08   (2006.01)
- C08F 4/70    (2006.01)

(52) U.S. Cl. ........................ 526/281; 526/273; 526/279; 526/283; 526/902; 428/396; 428/457; 264/236; 264/347; 156/307.3; 156/307.7

(58) Field of Classification Search ................ 526/281, 526/282, 283, 902, 273, 279; 428/396, 457; 156/307.3, 307.7; 264/236, 347
See application file for complete search history.

(56) References Cited

U.S. PATENT DOCUMENTS

| 5,728,785 A | 3/1998 | Grubbs et al. |
| 6,020,443 A | 2/2000 | Woodson et al. |
| 6,071,459 A * | 6/2000 | Warner et al. ................ 264/311 |
| 6,465,590 B1 * | 10/2002 | Maughon et al. ............ 526/264 |
| 2002/0111446 A1 * | 8/2002 | Mukerjee et al. ............ 526/169 |

FOREIGN PATENT DOCUMENTS

| JP | 06-248164 A | 6/1994 |
| JP | 11-507962 A | 7/1999 |
| JP | 2000-336152 A | 12/2000 |
| JP | 2001-071416 A | 3/2001 |
| JP | 2001-163959 A | 6/2001 |
| JP | 2002-265573 A | 9/2002 |
| WO | WO-97/03096 A1 | 1/1997 |
| WO | WO-00/71554 A2 | 11/2000 |

* cited by examiner

Primary Examiner—Fred M Teskin
(74) Attorney, Agent, or Firm—Birch, Stewart, Kolasch & Birch, LLP

(57) ABSTRACT

The invention relates to a process for the production of post-crosslinkable thermoplastic resins by bulk-polymerizing a polymerizable composition (A) comprising (I) a monomer fluid containing a cyclic olefin (α) having two or more metathetical ring-opening reaction sites in the molecule in an amount 10 wt % or above based on the total amount of the monomers or a monomer fluid containing a norbornene monomer and a crosslinking agent, (II) a metathetical polymerization catalyst, and (III) a chain transfer agent; thermoplastic resins obtained by this process; and a process for producing crosslinked resins or crosslinked resin composite materials which comprises laminating such a thermoplastic resin with a substrate at need and then crosslinking the thermoplastic resin. According to the invention, thermoplastic resins which are free from odor due to residual monomers and excellent in storage stability can be efficiently obtained by a simple process of bulk-polymerizing the composition (A). The process is not only easy and simple but also applicable to continuous production, thus being industrially advantageous. The crosslinked resins and crosslinked resin composite materials obtained according to the invention are excellent in electrical insulation properties, mechanical strengths, heat resistance, dielectric characteristics and so on, thus being useful as electrical materials or the like.

17 Claims, No Drawings

METHOD OF MANUFACTURING THERMOPLASTIC RESIN, CROSSLINKED RESIN, AND CROSSLINKED RESIN COMPOSITE MATERIAL

This application is a Divisional of application Ser. No. 10/519,228 filed on Jan. 30, 2006, now U.S. Pat. No. 7,476,716, and for which priority is claimed under 35 U.S.C. §120. Application Ser. No. 10/519,228 is the national phase of PCT International Application No. PCT/JP2003/008105 filed on Jun. 26, 2003 under 35 U.S.C. §371. This application also claims priority of Application Nos. 2002-190929 filed in Japan on Jun. 28, 2002, 2002-219255 filed in Japan on Jul. 29, 2002 and 2003-10967 filed in Japan on Jan. 20, 2003 under 35 U.S.C. §119. The entire contents of each of the above-identified applications are hereby incorporated by reference.

TECHNICAL FIELD

The present invention relates to a post-crosslinkable thermoplastic resin, a method for manufacturing the same, and to a method for manufacturing a crosslinked resin and crosslinked resin composite material comprising steps of heating, melting, and crosslinking the thermoplastic resin.

BACKGROUND ART

Conventionally, a method of obtaining a molded product by curing a resin which is produced by metathesis polymerization of a cycloolefin and the like has been known. For example, a method of preparing a thermoplastic resin such as a thermoplastic norbornene resin by solution polymerization and crosslinking the thermoplastic resin using a crosslinking agent such as an organic peroxide to obtain a crosslinked molded product, a method of reacting cycloolefins which can be polymerized by metathesis polymerization in the presence of a carbene complex such as ruthenium without using a solvent to obtain a half-cured molded product and laminating a copper foil on the resulting half-cured molded product by press-heating to obtain a copper-clad laminate, and other methods have been proposed.

As the former method of obtaining a crosslinked molded product, Japanese Patent Application Laid-open No. 6-248164 describes a method comprising preparing a homogeneously dispersed norbornene resin composition by adding 0.001-30 parts by weight of an organic peroxide to 100 parts by weight of a thermoplastic hydrogenated ring-opening norbornene resin and adding 0.1-10 parts by weight of a crosslinking agent to one part by weight of the organic peroxide, forming the composition into a film or prepreg, laminating the film or prepreg on another material (substrate), and crosslinking by fusing the resulting laminate by heat-press to obtain a crosslinked molded product. The patent specification describes that the crosslinked molded product exhibits excellent heat resistance, solvent resistance, chemical resistance, moisture resistance, water resistance, and electrical properties and is useful as an interlayer dielectric, a film for forming a moisture-proof layer, and the like.

However, the proposed method requires process steps of applying a thermoplastic resin composition solution to a substrate, removing the solvent to obtain a sheet, peeling the sheet from the substrate, and layering the sheet on a copper foil or the like, followed by a heat press operation. The method is complicated due to the many process steps and is not necessarily advantageous for manufacturing on an industrial scale. Moreover, the copper foil may be peeled off due to a residual solvent or may blister due to a gas generated from the solvent.

As the latter method of manufacturing a copper-clad laminate by metathesis polymerization of cycloolefins, Japanese Patent Application Laid-open No. 2001-71416 describes a method of preparing a semi-cured curable molded material by reacting metathesis-polymerizable cycloolefins in the presence of a carbene complex of ruthenium or osmium, placing a copper foil on at least one side of the molded material, and applying heat-press. This method has made it possible to efficiently manufacture a copper-clad laminate using a press-forming machine by dividing the process into a first step of obtaining a curable molding material in a half-cure state in which the polymerization (metathesis) reaction of raw material cycloolefins is not completed and a second step of completely curing the resulting molding material with heating.

However, this method has a drawback of unduly worsening the working environment due to an unacceptable odor of unreacted monomers when preparing the half-cured molding material. In addition, the hardness of the molding material may change due to a continued polymerization reaction while the material is stored in the half-cured state, making it difficult to obtain a copper-clad laminate with a desired form.

Japanese Patent Application Laid-open No. 11-507962 discloses a method which comprises polymerizing cycloolefins in the presence of a ruthenium-carbene complex and a crosslinking agent by metathesis polymerization to produce a polycycloolefin and post-curing (post-crosslinking) the polymer.

However, when the method taught by the patent specification is followed by heat-pressing the norbornene resin-copper foil laminate obtained by this method, only a cross-linking reaction proceeds without the resin before the post-cure being melted or fluidized. For this reason, it is difficult to produce a copper-clad laminate with excellent interlayer adhesion.

In view of this situation, an object of the present invention is to provide a post-crosslinkable thermoplastic resin and a method for manufacturing the same, the thermoplastic resin being obtainable by bulk polymerization of cycloolefins in the presence of a metathesis polymerization catalyst, and being free from a problem of an odor due to residual monomers, excelling in fluidity during melting with heating, and storage stability. Another object of the present invention is to provide a crosslinked resin and a method for manufacturing the same, the resin being obtained by crosslinking the above thermoplastic resin and excelling in electric insulation properties, mechanical strength, heat resistance, dielectric property, and the like. Still another object of the present invention is to provide a method for manufacturing a crosslinked resin composite material, and the composite material being obtained by laminating the thermoplastic resin of the present invention on a substrate and crosslinking the thermoplastic resin, excelling in adhesion between the crosslinked resin and substrate, and useful as an electrical material and the like.

DISCLOSURE OF THE INVENTION

To achieve the above objects, the present inventor has conducted extensive studies on the method for efficiently producing a post-crosslinkable thermoplastic resin by bulk polymerization of cycloolefins or norbornene monomers in the presence of a metathesis polymerization catalyst.

As a result, the present inventor has found that (i) a post-crosslinkable thermoplastic resin being free from a problem of an odor due to residual monomers, excelling in fluidity during melting with heating, and excelling in storage stability can be efficiently produced by polymerizing a monomer solution containing 10 wt % or more, based on the total amount of monomers, of a cycloolefin ($\alpha$) which has two or more metathesis ring-opening reaction sites in the molecule, or a monomer solution containing a norbornene monomer and a crosslinking agent, by bulk polymerization in the presence of a metathesis polymerization catalyst and a chain transfer agent, (ii) a crosslinked resin excelling in electric insulation properties, mechanical strength, heat resistance, dielectric property, and the like can be efficiently obtained by crosslinking the above thermoplastic resin, and (iii) a crosslinked resin composite material excelling in adhesion can be efficiently obtained by laminating the thermoplastic resin on a substrate and crosslinking the thermoplastic resin. These findings have led to the completion of the present invention.

Specifically, in the first place, the present invention provides a method for manufacturing a post-crosslinkable thermoplastic resin comprising polymerizing a polymerizable composition (A) by bulk polymerization, the polymerizable composition (A) comprising:

(I) a monomer solution containing 10 wt % or more, based on the total amount of monomers, of a cycloolefin ($\alpha$) which has two or more metathesis ring-opening reaction sites in the molecule, or a monomer solution containing a norbornene monomer and a crosslinking agent, (II) a metathesis polymerization catalyst, and (III) a chain transfer agent.

Therefore, the method for manufacturing the thermoplastic resin of the present invention comprises either (1) polymerizing a polymerizable composition (A) comprising a monomer solution containing 10 wt % or more, based on the total amount of monomers, of a cycloolefin ($\alpha$) which has two or more metathesis ring-opening reaction sites in the molecule, a metathesis polymerization catalyst, and a chain transfer agent by bulk polymerization, or (2) polymerizing a polymerizable composition (A) comprising a norbornene monomer, a metathesis polymerization catalyst, a chain transfer agent, and a crosslinking agent by bulk polymerization.

In the method of manufacturing the thermoplastic resin of the present invention, the maximum temperature during the bulk polymerization is preferably less than 230° C. and the polymerization reaction rate is preferably 80% or more.

In the method of manufacturing the thermoplastic resin of the present invention, the above-mentioned chain transfer agent is preferably a compound represented by the formula: $CH_2=CH-Q$, wherein Q is a group which has at least one group selected from the group consisting of a methacryloyl group, acryloyl group, vinyl silyl group, epoxy group, and amino group.

In the method of manufacturing the thermoplastic resin of the present invention according to (1) above, dicyclopentadiene is preferably used as the cycloolefin ($\alpha$).

In the method of manufacturing the thermoplastic resin of the present invention according to (2) above, a norbornene monomer mixture which contains a norbornene monomer having a carboxyl group or an acid-anhydride group as the norbornene monomer is preferably used and an epoxy compound is preferably used as the crosslinking agent. As another example of the method of manufacturing the thermoplastic resin according to (2) above, the bulk polymerization of a polymerizable composition (A) is preferably carried out using a radical generating agent as the crosslinking agent and at a reaction temperature below the one-minute half-life temperature of the radical generating agent, and more preferably further using a radical crosslinking retarder as a component of the polymerizable composition (A).

In the second place, the present invention provides the post crosslinkable thermoplastic resin produced by the method of the present invention.

The thermoplastic resin of the present invention that can be obtained by the bulk polymerization of the above-mentioned polymerizable composition (A) on a support and molded into the film form is preferable. The support is preferably a metal foil or resin film.

The thermoplastic resin that can be obtained by the bulk polymerization of the above-mentioned polymerizable composition (A) in a mold and molded into a prescribed form is also preferable in the present invention.

The thermoplastic resin that can be obtained by impregnating a textile material with the above-mentioned polymerizable composition (A) and polymerizing the polymerizable composition (A) by bulk polymerization is also preferable.

In the third place, the present invention provides a method for manufacturing a crosslinked resin comprising a step of crosslinking the thermoplastic resin of the present invention.

In the fourth place, the present invention provides a method for manufacturing a crosslinked resin composite material comprising a step of laminating the thermoplastic resin of the present invention and crosslinking the thermoplastic resin portion.

In the process for producing the crosslinked resin composite material of the present invention, a metal foil is preferably used as the substrate material. Use of a metal foil treated with a silane coupling agent of the following formula (1) or a thiol coupling agent of the following formula (2) is more preferable.

 (1)

 (2)

wherein R is a group having a double bond, a mercapto group, or an amino group at the terminal, X and Y individually represent a hydrolyzable group, a hydroxyl group, or an alkyl group, Z represents a hydrolyzable group or a hydroxyl group, T represents an aromatic ring, an aliphatic ring, a heterocyclic, or an aliphatic chain, and n is an integer of 2 or more.

In the method of manufacturing the crosslinked resin composite material of the present invention, a printed circuit board is preferably used as the substrate.

BEST MODE FOR CARRYING OUT THE INVENTION

The present invention will be described in detail below in the following sections: 1) the method of manufacturing the post-crosslinkable thermoplastic resin and the thermoplastic resin produced by this method, 2) the method of manufacturing the crosslinked resin, and 3) the method of manufacturing the crosslinked resin composite material.

1) Method of Manufacturing Post-Crosslinkable Thermoplastic Resin and the Thermoplastic Resin The method of manufacturing post-crosslinkable thermoplastic resin is characterized by polymerizing the polymerizable composition (A) which comprises (I) a monomer solution containing 10 wt % or more, based on the total amount of monomers, of a cycloolefin ($\alpha$) having two or more metathesis ring-opening reaction sites in the molecule, or a monomer solution containing a norbornene monomer and a crosslinking agent, (II) a metathesis polymerization catalyst, and (III) a chain transfer agent by bulk polymerization.

(I) Monomer Solution

In the present invention, either a monomer solution containing 10 wt % or more, based on the total amount of monomers, of a cycloolefin ($\alpha$) having two or more metathesis ring-opening reaction sites in the molecule (hereinafter referred to as "monomer solution 1") or a monomer solution containing a norbornene monomer and a crosslinking agent (hereinafter referred to as "monomer solution 2") is used as the monomer solution.

(Monomer Solution 1)

The monomer solution 1 comprises a cycloolefin (α) having two or more metathesis ring-opening reaction sites in the molecule in an amount of 10 wt % or more of the total amount of monomers.

The cycloolefin (α) is an olefin compound with a ring structure having two or more metathesis ring-opening reaction sites in the molecule. The metathesis ring-opening reaction site herein indicates the site of a carbon-carbon double bond in a cyclic structure, in which the double bond cleaves by the metathesis reaction accompanied by ring opening.

As examples of the olefin compound with a cyclic structure having a metathesis ring-opening reaction site, a compound having a cyclobutene ring, cyclopentene ring, cyclohexene ring, cycloheptene ring, cyclooctene ring, cyclododecene ring, bicyclo[2.2.1]heptene ring, or the like can be given.

As examples of the cycloolefin (α), a monocyclic compound with one type of the cyclic structure having a metathesis ring-opening reaction site, a condensed cyclic compound with one or more types of the cyclic structure, and a polycyclic compound with one or more types of the cyclic structure combined together.

Although there are no specific limitations to the number of carbon atoms possessed by the cycloolefin (α), the number of carbon atoms is usually 7-30, and preferably 7-20. There are also no specific limitations to the number of the metathesis reaction sites in the cycloolefin (α) in so far as two or more such sites are present. The number is usually 2-5, and preferably 2-4.

It is preferable in the cycloolefin (α) used in the present invention that the above-mentioned at least two or more metathesis ring-opening reaction sites are present in different rings, each having a different cyclic structure from the other. Since the reactivity of one ring-opening reaction site in this type of cycloolefin (α) differs from the reactivity of the other such site, it is possible to cause the one ring-opening reaction site to be solely involved in the ring-opening reaction and to preserve the other site unreacted in the resulting thermoplastic resin for the metathesis crosslinking reaction in the post-crosslinking stage. This ensures efficient production of post-crosslinkable thermoplastic resin containing only a small amount of residual monomers (resulting in a high polymerization reaction rate) and excelling in storage stability.

The following compounds (a)-(c) can be given as specific examples of the cycloolefin (α).

(a) Condensed cyclic compounds having the same or different condensed cycloolefin rings such as pentacyclo[6.5.1.1$^{3,6}$.0$^{2,7}$.0$^{9,13}$]pentadeca-4,10-diene, pentacyclo[9.2.1.1$^{4,7}$.0$^{2,10}$.0$^{3,8}$]pentadeca-5,12-diene, dicyclopentadiene, tetracyclo[6.2.1.1$^{3,6}$.0$^{2,7}$]dodeca-4,9-diene, tricyclo[12.2.1.0$^{2,13}$]heptadeca-5,9,15-triene, tetracyclo[9.2.1.0$^{2,10}$.0$^{4,8}$]tetradeca-5,12-diene, pentacyclo[9.2.1.1$^{3,9}$.0$^{2,10}$.0$^{4,8}$]pentadeca-5,12-diene, norbornadiene, bicyclo[6.2.0]deca-4,9-diene, bicyclo[6.3.0]undeca-4,9-diene, and tricyclo[8.2.1.0$^{2,9}$]trideca-5,11-diene.

(b) Polycyclic compounds formed by single bond of the same or different cycloolefin rings such as 9-cyclohexenyltetracyclo[6.2.1.1$^{3,6}$.0$^{2,7}$]dodec-4-ene, 9-cyclopentenyltetracyclo[6.2.1.1$^{3,6}$.0$^{2,7}$]dodec-4-ene, 5-cyclohexenyl-2-norbornene, 5-cyclopentenyl-2-norbornene, 5,5'-bi-(2-norbornene), 5-cyclooctenyl-2-norbornene, 5-norbornene-2-carboxylate-3-cyclopenten-1-yl, and 5-norbornene-2-carboxylate-5-norbornen-2-yl.

(c) Compounds having at least one substituent at any site of the above compounds (a) or (b), the substituents being selected from the group consisting of an alkyl group such as a methyl group, ethyl group, n-propyl group, isopropyl group, and n-butyl group; an alkylidene group such as a methylidene group, ethylidene group, propylidene group, and butylidene group; an aromatic hydrocarbon group such as a phenyl group and naphthyl group; a carboxyl group; an alkoxycarbonyl group such as a methoxycarbonyl group, ethoxycarbonyl group, propoxycarbonyl group, and butoxycarbonyl group; an acid anhydride group; and a cyano group.

These compounds may be used either individually or in combination of two or more.

Among these compounds, dicyclopentadiene is a particularly preferable cycloolefin (α) from the viewpoints of easy availability, metathesis polymerization reaction rate, and capability of producing a thermoplastic resin with excellent storage stability.

The amount of cycloolefin (α) is 10 wt % or more, preferably 20 wt % or more, and still more preferably 30 wt % or more of the total amount of monomers. If the amount of the cycloolefin (α) is less than 10 wt %, post-crosslinking is difficult.

In addition to the cycloolefin (α), a cycloolefin (β) having one metathesis ring-opening reaction site in the molecule can be added to the monomer solution 1.

Specific preferable examples of the cycloolefin (β) are norbornene monomers; monocycloolefins such as cyclobutene, cyclooctene, 1,5-cyclooctadiene; and the like. These cycloolefins may be substituted with a hydrocarbon group such as an alkyl group, alkenyl group, alkylidene group, or aryl group, or a polar group.

Given as specific examples of norbornene monomers are tetracyclododecenes such as tetracyclo[6.2.1.1$^{3,6}$.0$^{2,7}$]dodec-4-ene, 9-methyltetracyclo[6.2.1.1$^{3,6}$.0$^{2,7}$]dodec-4-ene, 9-ethyltetracyclo[6.2.1.1$^{3,6}$.0$^{2,7}$]dodec-4-ene, 9-cyclohexyltetracyclo[6.2.1.1$^{3,6}$.0$^{2,7}$]dodec-4-ene, 9-cyclopentyltetracyclo[6.2.1.1$^{3,6}$.0$^{2,7}$]dodec-4-ene, 9-methylenetetracyclo[6.2.1.1$^{3,6}$.0$^{2,7}$]dodec-4-ene, 9-ethylidenetetracyclo[6.2.1.1$^{3,6}$.0$^{2,7}$]dodec-4-ene, 9-vinyltetracyclo[6.2.1.1$^{3,6}$.0$^{2,7}$]dodec-4-ene, 9-propenyltetracyclo[6.2.1.1$^{3,6}$.0$^{2,7}$]dodec-4-ene, 9-phenyltetracyclo[6.2.1.1$^{3,6}$.0$^{2,7}$]dodec-4-ene, methyl tetracyclo[6.2.1.1$^{3,6}$.0$^{2,7}$]dodec-9-ene-4-carboxylate, 4-methyltetracyclo[6.2.1.1$^{3,6}$.0$^{2,7}$]dodec-9-ene-4-carboxylate, tetracyclo[6.2.1.1$^{3,6}$.0$^{2,7}$]dodec-9-ene-4-methanol, tetracyclo[6.2.1.1$^{3,6}$.0$^{2,7}$]dodec-9-ene-4-ol, tetracyclo[6.2.1.1$^{3,6}$.0$^{2,7}$]dodec-9-ene-4-carboxylic acid, tetracyclo[6.2.1.1$^{3,6}$.0$^{2,7}$]dodec-9-ene-4,5-carboxylic acid, tetracyclo[6.2.1.1$^{3,6}$.0$^{2,7}$]dodec-9-ene-4,5-dicarboxylic acid anhydride, tetracyclo[6.2.1.1$^{3,6}$.0$^{2,7}$]dodec-9-ene-4-nitrile, tetracyclo[6.2.1.1$^{3,6}$.0$^{2,7}$]dodec-9-ene-4-carbaldehyde, tetracyclo[6.2.1.1$^{3,6}$.0$^{2,7}$]dodec-9-ene-4-carboxamide, tetracyclo[6.2.1.1$^{3,6}$.0$^{2,7}$]dodec-9-ene-4,5-dicarboxylic acid imide, 9-chlorotetracyclo[6.2.1.1$^{3,6}$0$^{2,7}$]dodec-4-ene, 4-trimethoxysilyltetracyclo[6.2.1.1$^{3,6}$.0$^{2,7}$]dodec-9-ene, 9-acetyltetracyclo[6.2.1.1$^{3,6}$.0$^{2,7}$]dodec-4-ene; norbornenes such as tricyclo[5.2.1.0$^{2,6}$]dec-8-ene, 2-norbornene, 5-methyl-2-norbornene, 5-ethyl-2-norbornene, 5-butyl-2-norbornene, 5-hexyl-2-norbornene, 5-decyl-2-norbornene, 5-cyclohexyl-2-norbornene, 5-cyclopentyl-2-norbornene, 5-ethylidene-2-norbornene, 5-vinyl-2-norbornene, 5-propenyl-2-norbornene, 5-phenyl-2-norbornene, tetracyclo[9.2.1.0$^{2,10}$.0$^{3,8}$]tetradeca-3,5,7,12-tetraene (also known as 1,4-methano-1,4,4a,9a-tetrahydro-9H-fluorene), tetracyclo[10.2.1.0$^{2,11}$.0$^{4,9}$]pentadeca-4,6,8,13-tetraene (also known as 1,4-methano-1, 4,4a,9,9a,10-hexahydroanthracene), methyl 5-norbornene-2-carboxylate, ethyl 5-norbornene-2-carboxylate, methyl 2-methyl-5-norbornene-2-carboxylate, ethyl 2-methyl-5-norbornene-2-carboxylate, 5-norbornen-2-yl acetate, 2-methyl-5-norbornen-2-yl acetate, 5-norbornen-2-yl acrylate, 5-norbornen-2-yl methacrylate, 5-norbornene-2-carboxylate, 5-norbornene-2,3-dicarboxylate, 5-norbornene-2,3-dicarboxylate anhydride, 5-norbornene-2-methanol, 5-norbornene-2,3-dimethanol, 5-norbornene-2,2-dimethanol, 5-norbornene-2-ol, 5-norbornene-2-nitrile, 5-norbornene-2-carbaldehyde, 5-norbornene-2-carboxamide, 2-acetyl-5-norbornene, and 3-methoxycarbonyl-5-norbornene-2-carboxylate; oxanorbornenes such as 7-oxa-2-norbornene, 5-methyl-7-oxa-2-norbornene, 5-ethyl-7-oxa-2-norbornene, 5-butyl-7-oxa-2-norbornene, 5-hexyl-7-oxa-2-norbornene, 5-cyclohexyl-7-oxa-2-norbornene, 5-ethylidene-7-oxa-2-norbornene, 5-phenyl-7-oxa-2-norbornene, methyl 7-oxa-5-norbornene-2-carboxylate, 7-oxa-5-norbornen-2-yl acetate, and 7-oxa-5-norbornen-2-yl methacrylate; and 5-member or more cycloolefins such as hexacyclo[6.6.1.1$^{3,6}$.1$^{10,13}$.0$^{2,7}$.0$^{9,14}$]heptadec-4-ene.

These compounds may be used either individually or in combination of two or more as the cycloolefin (β).

(Monomer Solution 2)

Monomer solution 2 comprises a norbornene monomer and a crosslinking agent.

As the norbornene monomer, any norbornene monomers given as examples of the cycloolefin (β) can be used. In addition, any compounds having a bicyclo[2.2.1]heptene ring given as examples of the cycloolefin (α) can also be used.

Either one norbornene monomer or a mixture of two or more norbornene monomers can be used. It is possible to freely control the glass transition temperature and melting point of the thermoplastic resin by changing the ratio of the two or more norbornene monomers used in combination.

In addition, a norbornene monomer mixture prepared by adding a monocyclic cycloolefin such as cyclobutene, cyclopentene, cyclooctene, cyclododecene, and 1,5-cyclooctadiene or a derivative of these monocyclic cycloolefins having a substitutent can also be used as the monomer solution 2. The amount of monocyclic cycloolefins and their derivatives is preferably 40 wt % or less, and more preferably 20 wt % or less of the total amount of norbornene monomers. If more than 40 wt %, the polymer obtained by bulk polymerization may be an elastomer instead of a resin.

Of the above monomers, when an epoxy compound is used as the crosslinking agent, a norbornene monomer mixture which contains a norbornene monomer having a carboxyl group or an acid-anhydride group as the norbornene monomer is preferably used due to easy production of a crosslinked resin. The content of the norbornene monomer having a carboxyl group or an acid-anhydride group in the above norbornene monomer mixture is preferably 1 mol % or more, and more preferably 5 mol % or more.

The crosslinking agent used in the present invention causes a crosslinking reaction with the functional group of the thermoplastic resin produced by bulk polymerization of norbornene monomers to produce a crosslinked resin. As examples of the functional group, a carbon-carbon double bond, carboxylic acid group, acid anhydride group, hydroxyl group, amino group, active halogen atom, and epoxy group can be given.

As examples of the crosslinking agent, a radical generating agent, epoxy compound, isocyanate group-containing compound, carboxyl group-containing compound, acid anhydride group-containing compound, amino-group containing compound, and Lewis acid can be given. These crosslinking agents may be used either individually or in combination of two or more. Of these, a radical generating agent, epoxy compound, isocyanate group-containing compound, carboxyl group-containing compound, and acid anhydride group-containing compound are preferable. A radical generating agent, epoxy compound, and isocyanate group-containing compound are more preferable crosslinking agents, with a radical generating agent or epoxy compound being particularly preferable.

As examples of the radical generating agent, organic peroxides and azo compounds can be given. Examples of the organic peroxide include, but are not limited to, hydroperoxides such as t-butyl hydroperoxide, p-menthane hydroperoxide, and cumene hydroperoxide; dialkyl peroxides such as dicumyl peroxide, t-butyl cumyl peroxide, α,α'-bis(t-butylperoxy-m-isopropyl)benzene, di-t-butylperoxide, 2,5-dimethyl-2,5-di(t-butylperoxy)-3-hexine, 2,5-dimethyl-2,5-di(t-butylperoxy)hexane; diacyl peroxides such as dipropionyl peroxide and benzoyl peroxide; peroxyketals such as 2,5-dimethyl-2,5-di(t-butylperoxy)hexane, 2,5-dimethyl-2,5-di(t-butylperoxy)hexin-3,1,3-di(t-butylperoxyisopropyl)benzene; peroxy esters such as t-butylperoxy acetate and t-butylperoxy benzoate; peroxycarbonate such as t-butylperoxy isopropylcarbonate and di(isopropylperoxy)dicarbonate; ketone peroxides; and alkylsilylperoxides such as t-butyltrimethylsilyl peroxide. Of these, dialkyl peroxides are preferable due to a small hindrance to the metathesis polymerization reaction.

Examples of the diazo compound include 4,4'-bisazidobenzal(4-methyl)cyclohexanone, 4,4'-diazidochalcone, 2,6-bis(4'-azidobenzal)cyclohexanone, 2,6-bis(4'-azidobenzal)-4-methylcyclohexanone, 4,4'-diazidodiphenylsulfone, 4,4'-diazidodiphenylmethane, 2,2'-diazidostilbene, and the like.

As the epoxy compound, compounds having two or more epoxy groups in the molecule, for example, a phenol novolak epoxy compound, cresol novolak epoxy compound, cresol epoxy compound, glycidyl ether-type epoxy compounds such as bisphenol A epoxy compound, bisphenol F epoxy compound, brominated bisphenol A epoxy compound, brominated bisphenol F epoxy compound, and hydrogenated bisphenol A epoxy compound; polyvalent epoxy compounds such as an alicyclic epoxy compound, glycidyl ester epoxy compound, glycidyl amine epoxy compound, and isocyanurate epoxy compound, and the like can be given.

As the isocyanate group-containing compound, compounds having two or more isocyanate groups in the molecule such as p-phenylene diisocyanate, 2,6-toluene diisocyanate, hexamethylene diisocyanate, and the like can be given.

As examples of the carboxyl group-containing compound, compounds having two or more carboxyl groups such as fumaric acid, phthalic acid, maleic acid, trimellitic acid, himic acid, terephthalic acid, isophthalic acid, adipic acid, and sebacic acid can be given.

As specific examples of the acid anhydride group-containing compounds, maleic anhydride, phthalic anhydride, pyromellitic anhydride, benzophenone tetracarboxylic anhydride, nadic anhydride, 1,2-cyclohexane dicarboxylic anhydride, and maleic anhydride-modified polypropylene can be given.

As the Lewis acid, silicon tetrachloride, hydrochloric acid, sulfuric acid, ferric chloride, aluminum chloride, stannic chloride, titanium tetrachloride, and the like can be given.

As the amino group-containing compound, compounds having two or more amino groups in the molecule, for example, aliphatic diamines such as trimethyl hexamethylenediamine, ethylenediamine, and 1,4-diaminobutane, aliphatic polyamines such as triethylene tetramine, pentaethylene hexamine, and aminoethyl ethanolamine, aromatic amines such as phenylenediamine, 4,4'-methylenedianiline, toluenediamine, and diaminoditolyl sulfone can be given.

In the present invention, the type of crosslinking agent to be used can be properly selected according to the position to be bridged (crosslinking position) in the thermoplastic resin. For example, when the polymer molecules are bridged at the carbon-carbon double bond, a radical generating agent can be used. When the thermoplastic resin having a carboxyl group or an acid-anhydride group is bridged, an epoxy compound can be used. When the thermoplastic resin having a hydroxyl group is bridged, a compound having an isocyanate group can be used. When the thermoplastic resin having an epoxy group is bridged, a compound having a carboxyl group or an acid-anhydride group can be used. In addition, Lewis acid can also be used as a crosslinking agent for cationically bridging the molecules.

There are no specific limitations to the amount of the crosslinking agent. Such an amount can be appropriately determined according to the kind of the crosslinking agent used. When a radical generating agent is used as a crosslinking agent, the amount of the crosslinking agent used is usually 0.1-10 parts by weight, and preferably 0.5-5 parts by weight for 100 parts by weight of the norbornene monomers. When an epoxy compound is used as a crosslinking agent, the amount of the crosslinking agent used is usually 1-100 parts by weight, and preferably 5-50 parts by weight for 100 parts by weight of the norbornene monomers. If the amount of the crosslinking agent is too small, crosslinking is insufficient and a crosslinking resin with a high crosslinking density may not be obtained. If too much an amount is used, not only does the crosslinking effect reach saturation, there is also a possibility that the thermoplastic resin and the crosslinked resin having desired properties cannot be obtained.

In the present invention, a crosslinking adjuvant can be used in combination with the crosslinking agent to improve the crosslinking effect. Conventionally known crosslinking adjuvants can be used without any specific limitations. As examples, dioxime compounds such as p-quinone dioxime, methacrylate compounds such as lauryl methacrylate and trimethylolpropane trimethacrylate, fumaric acid compounds such as a diallyl fumarate, phthalic acid compounds such as a diallyl phthalate, cyanuric acid compounds such as triallyl cyanulate, and imide compound such as maleimide can be given. Although there are no specific limitations, the amount of the crosslinking adjuvant used is usually 0-100 parts by weight, and preferably 0-50 parts by weight for 100 parts by weight of the norbornene monomers.

When a radical generating agent is used as a crosslinking agent in the present invention, it is a preferable to add a radical crosslinking retarder to the polymerizable composition (A). The radical crosslinking retarder is a compound generally having a radical capture function and exhibits the effect of delaying the radical crosslinking reaction caused by a radical generating agent. Flowability of the thermoplastic resin in case of laminating the resin and storage stability of the thermoplastic resin can be improved by adding a radical crosslinking retarder to the polymerizable composition (A).

As examples of the radical crosslinking retarder, alkoxy phenols such as 4-methoxyphenol, 4-ethoxyphenol, 3-t-butyl-4-hydroxyanisole, 2-t-butyl 4-hydroxyanisole, and 3,5-di-t-butyl-4-hydroxyanisole; hydroquinones such as hydroquinone, 2-methylhydroquinone, 2,5-dimethylhydroquinone, 2-t-butylhydroquinone, 2,5-di-t-butylhydroquinone, 2,5-di-t-amylhydroquinone, 2,5-bis(1,1-dimethylbutyl)hydroquinone, and 2,5-bis(1,1,3,3-tetramethylbutyl)hydroquinone; catechols such as catechol, 4-t-butylcatechol, and 3,5-di-t-butylcatechol; and benzoquinones such as benzoquinone, naphthoquinone, and methylbenzoquinone can be given. Of these, alkoxy phenols, catechols, and benzoquinones are preferable, with the alkoxy phenols being particularly preferable.

The amount of the radical crosslinking retarder is usually 0.001-1 mol, and preferably 0.01-1 mol for 1 mol of radical generating agent.

(II) Metathesis Polymerization Catalyst

There are no specific limitations to the metathesis polymerization catalyst used in the present invention to the extent that the catalyst can polymerize the above-mentioned cycloolefin (α) and norbornene monomer by the metathesis ring-opening polymerization. As the metathesis polymerization catalyst that can be used, a complex formed from a plurality of ions, atoms, polyatomic ions, and/or compounds bonded to a transition metal atom as the center atom can be given. As the transition metal atom, the atoms of groups V, VI, and VIII (in a long periodic-type periodic table, hereinafter the same) can be used. Although there are no specific limitations to the atoms belonging to each group, examples include tantalum as the group V atom, molybdenum and tungsten as the group VI atom, and ruthenium and osmium as the group VI atom.

Of these, ruthenium and osmium of the group VIII metal are preferable as the complex for the metathesis polymerization catalyst, with a ruthenium-carbene complex being particularly preferred. Due to excellent catalyst activity in bulk polymerization, the ruthenium-carbene complex exhibits excellent productivity when applied to the production of a post-crosslinkable thermoplastic resin. A thermoplastic resin with almost no unfavorable odor (originating from unreacted monomers) can be manufactured with excellent productivity. In addition, since the catalyst is comparatively stable and is not easily deactivated in oxygen or moisture in the air, the thermoplastic polymer can be manufactured under atmospheric conditions using the catalyst.

The ruthenium-carbene complex is a compound represented by the following formulas (3) and (4).

(3)

(4)

wherein $R^1$ and $R^2$ individually represent a hydrogen atom, a halogen atom, or a hydrocarbon group having 1-20 carbon atoms which may contain a halogen atom, oxygen atom, nitrogen atom, sulfur atom, phosphorus atom, or silicon atom. $X^1$ and $X^2$ individually represent an anionic ligand. $L^1$ and $L^2$ individually represent a hetero atom-containing carbene compound or a neutral electron-donating compound. $R^1$, $R^2$, $X^1$, $X^2$, $L^1$, and $L^2$ groups may bond in any optional combination to form a multidentate chelated ligand.

The hetero atom is an atom of the Group XV or XVI in the Periodic Table. Specific examples include N, O, P, S, As, and Se. Of these, N, O, P, S, and the like are preferable, and N is particularly preferable, because a stable carbene compound can be obtained.

A hetero atom-containing carbene compound having hetero atoms bonding to both sides of the carbene carbon atom is preferable, with a carbene compound having a hetero ring which includes a carbene carbon atom and hetero atoms on both sides of the carbon atom being more preferable. It is desirable that hetero atoms adjacent to a carbene atom have a bulky substitutent.

As examples of such hetero atom containing carbene compounds, compounds shown by the following formulas (5) and (6) can be given:

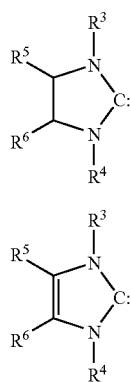

wherein $R^3$ to $R^6$ individually represent a hydrogen atom, a halogen atom, or a hydrocarbon group having 1-20 carbon atoms which may contain a halogen atom, oxygen atom, nitrogen atom, sulfur atom, phosphorus atom, or silicon atom. $R^3$ to $R^6$ may be bonded in any optional combination to form a ring.

Specific examples of the compound of the formula (5) or (6) include 1,3-dimesitylimidazolidin-2-ylidene, 1,3-di(1-adamantyl)imidazolidin-2-ylidene, 1-cyclohexyl-3-mesityl-imidazolidin-2-ylidene, 1,3-dimesityloctahydrobenzimidazol-2-ylidene, 1,3-diisopropyl-4-imidazolin-2-ylidene, 1,3-di(1-phenylethyl)-4-imidazolin-2-ylidene, and 1,3-dimesityl-2,3-dihydrobenzimidazol-2-ylidene.

In addition to the compounds represented by the above formula (5) or (6), other hetero atom containing carbene compounds such as 1,3,4-triphenyl-2,3,4,5-tetrahydro-1H-1,2,4-triazol-5-ylidene, 1,3-dicyclohexylhexahydropyrimidin-2-ylidene, N,N,N',N'-tetraisopropylformalidinylidene, 1,3,4-triphenyl-4,5-dihydro-1H-1,2,4-triazol-5-ylidene, and 3-(2,6-diisopropylphenyl)-2,3-dihydrothiazol-2-ylidene can be used.

In the above formulas (3) and (4), the anionic ligands $X^1$ and $X^2$ are ligands having a negative charge when separated from the central metal. Examples of the ligands include halogen atoms such as a fluorine atom, chlorine atom, bromine atom, and iodine atom; a diketonate group, substituted cyclopentadienyl group, alkoxy group, aryloxy group, and carboxyl group. Of these, halogen atoms are preferable, and a chlorine atom is more preferable.

A neutral electron-donating compound may be any ligand having a neutral charge when separated from the central metal. Specific examples include carbonyls, amines, pyridines, ethers, nitrites, esters, phosphines, thioethers, aromatic compounds, olefins, isocyanides, and thiocyanates. Of these, phosphines, ethers, and pyridines are preferable, and trialkylphosphine is more preferable.

Examples of the complex compound of the formula (3) include ruthenium complex compounds in which a hetero atom-containing compound and a neutral electron-donating compound are bonded such as benzylidene(1,3-dimesitylimidazolidin-2-ylidene)(tricyclohexylphosphine)ruthenium dichloride, (1,3-dimesitylimidazolidin-2-ylidene)(3-methyl-2-buten-1-ylidene)(tricyclopentylphosphine)ruthenium dichloride, benzylidene(1,3-dimesityl-octahydrobenzimidazol-2-ylidene)(tricyclohexylphosphine)ruthenium dichloride, benzylidene[1,3-di(1-phenylethyl)-4-imidazolin-2-ylidene](tricyclohexylphosphine)ruthenium dichloride, benzylidene(1,3-dimesityl-2,3-dihydrobenzimidazol-2-ylidene)(tricyclohexylphosphine)ruthenium dichloride, benzylidene(tricyclohexylphosphine)(1,3,4-triphenyl-2,3,4,5-tetrahydro-1H-1,2,4-triazol-5-ylidene)ruthenium dichloride, (1,3-diisopropylhexahydropyrimidin-2-ylidene)(ethoxymethylene) (tricyclohexylphosphine)ruthenium dichloride, benzylidene(1,3-dimesitylimidazolidin-2-ylidene)pyridineruthenium dichloride, (1,3-dimesitylimidazolidin-2-ylidene)(2-phenylethylidene) (tricyclohexylphosphine)ruthenium dichloride, and (1,3-dimesityl-4-imidazolin-2-ylidene)(2-phenylethylidene) (tricyclohexylphosphine) ruthenium dichloride; ruthenium compounds in which two neutral electron-donating compounds are bonded such as benzylidenebis(tricyclohexylphosphine)ruthenium dichloride and (3-methyl-2-buten-1-ylidene)bis(tricyclopentylphosphine)ruthenium dichloride; and ruthenium complex compounds in which two hetero atom-containing carbene compounds are bonded such as benzylidenebis(1,3-dicyclohexylimidazolidin-2-ylidene)ruthenium dichloride and benzylidenebis(1,3-diisopropyl-4-imidazolin-2-ylidene)ruthenium dichloride.

As examples of the complex compound of the formula (3) in which $R^1$ and $L^1$ bond, compounds shown by the following formulas (7) to (9) can be given.

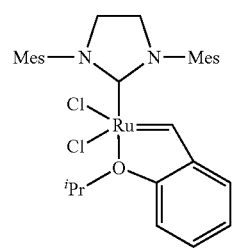

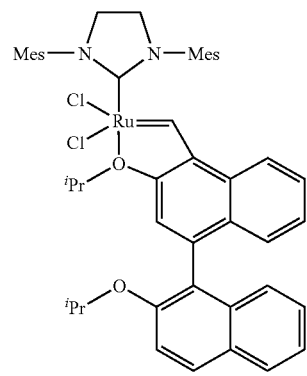

-continued

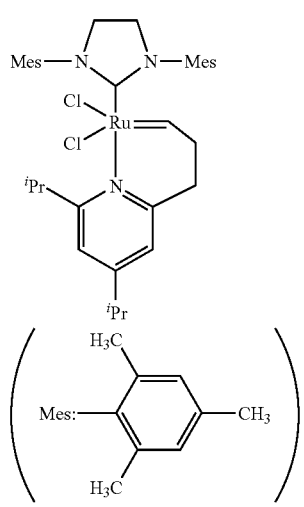

(9)

Examples of the complex compound of the formula (4) include (1,3-dimesitylimidazolidin-2-ylidene)(phenylvinylidene) (tricyclohexylphosphine)ruthenium dichloride, (t-butylvinylidene)(1,3-diisopropyl-4-imidazolin-2-ylidene) (tricyclopentylphosphine)ruthenium dichloride, and bis(1,3-dicyclohexyl-4-imidazolin-2-ylidene)phenylvinylideneruthenium dichloride.

These ruthenium complex catalysts can be produced by the methods described in Org. Lett., 1999, Vol. 1, p. 953 and Tetrahedron. Lett., 1999, Vol. 40, p. 2247, for example.

The metathesis polymerization catalyst is used at a molar ratio of the metal atoms in the catalyst to the cycloolefins of 1:2,000 to 1:2,000,000, preferably 1:5,000 to 1:1,000,000, and more preferably 1:10,000 to 1:500,000.

If necessary, the metathesis polymerization catalyst may be used dissolved or suspended in a small amount of inert solvent. Examples of the solvent include chain aliphatic hydrocarbons such as n-pentane, n-hexane, n-heptane, liquid paraffin, mineral spirit; alicyclic hydrocarbons such as cyclopentane, cyclohexane, methylcyclohexane, dimethylcyclohexane, trimethylcyclohexane, ethylcyclohexane, diethylcyclohexane, decahydronaphthalene, dicycloheptane, tricyclodecane, hexahydroindene cyclohexane, and cyclooctane; and aromatic hydrocarbons such as benzene, toluene, and xylene, nitrogen-containing hydrocarbons such as nitromethane, nitrobenzene, and acetonitrile; and oxygen-containing hydrocarbons such as diethyl ether and tetrahydrofuran. Of these, common industrial solvents such as aromatic hydrocarbons, aliphatic hydrocarbons, and alicyclic hydrocarbons are preferably used. In addition, a liquid aging preventive, plasticizer, or elastomer may be used as a solvent to the extent not reducing the activity of the metathesis polymerization catalyst.

An activator (co-catalyst) may be used in combination with the metathesis polymerization catalyst to control the polymerization activity or to increase the rate of the polymerization reaction. As the activator, an alkyl compound, a halide, an alkoxy compound, an aryloxy compound, and the like of aluminum, scandium, tin, titanium, or zirconium can be given.

Specific examples of the activator include trialkoxy aluminum, triphenoxy aluminum, dialkoxyalkyl aluminum, alkoxydialkyl aluminum, trialkyl aluminum, dialkoxy aluminum chloride, alkoxyalkyl aluminum chloride, dialkyl aluminum chloride, trialkoxy scandium, tetraalkoxy titanium, tetraalkoxy tin, and tetraalkoxy zirconium.

The activator is used at a molar ratio of the metal atoms in the metathesis polymerization catalyst to the activator of 1:0.05 to 1:100, preferably 1:0.2 to 1:20, and more preferably 1:0.5 to 1:10.

When the complex of a transition metal atom of Group V or Group VI is used as a metathesis polymerization catalyst, it is desirable that both the metathesis polymerization catalyst and activator are dissolved in the monomers. However, it is possible to dissolve or suspend the metathesis polymerization catalyst and activator in a small amount of solvent to the extent that properties of the resulting products are not impaired in substance.

(III) Chain Transfer Agent

In the manufacturing method of the present invention, a chain transfer agent is used as a component of the polymerizable composition (A). A thermoplastic resin can be obtained by polymerizing the monomers in the presence of a chain transfer agent.

As the chain transfer agent, a chain olefin which may have a substitutent, for example, can be used. Specific examples include aliphatic olefins such as 1-hexene and 2-hexene; olefins having an aromatic group such as styrene, divinylbenzene, and stilbene; olefins having an alicyclic hydrocarbon group such as vinyl cyclohexane; vinyl ethers such as ethyl vinyl ether; vinyl ketones such as methyl vinyl ketone, 1,5-hexadien-3-on, 2-methyl-1,5-hexadien-3-on; compounds represented by the formula $CH_2=CH\text{-}Q$, wherein Q is a group which has at least one group selected from the group consisting of a methacryloyl group, acryloyl group, vinyl silyl group, epoxy group, and amino group. Of these, compounds represented by the formula $CH_2=CH\text{-}Q$ is preferable, because the group Q is introduced into the polymer terminals and contributes to crosslinking of the polymer, thereby increasing the crosslinking density.

As specific examples of the compound represented by the formula $CH_2=CH\text{-}Q$, compounds in which Q has a methacryloyl group such as vinyl methacrylate, allyl methacrylate, 3-buten-1-yl methacrylate, 3-buten-2-yl methacrylate, and styryl methacrylate; compounds in which Q has an acryloyl group such as allyl acrylate, 3-buten-1-yl acrylate, 3-buten-2-yl acrylate, 1-methyl-3-buten-2-yl acrylate, styryl acrylate, and ethylene glycol diacrylate; compounds in which Q has a vinyl silyl group such as allyl trivinyl silane, allyl methyl divinyl silane, and allyl dimethyl vinyl silane; compounds in which Q has an epoxy group such as glycidyl(metha)acrylate and allyl glycidyl ether; and compounds in which Q has an amino group such as allylamine, 2-(diethylamino)ethanol vinyl ether, 2-(diethylamino)ethyl acrylate, 4-vinylaniline; can be given.

The amount of the chain transfer agent to be added is usually 0.01-10 wt %, and preferably 0.1-5 wt % of the total amount of the monomer solution. The amount of the chain transfer agent in this range ensures a high polymerization conversion ratio and efficient production of post-crosslinkable thermoplastic resin. If the amount of the chain transfer agent is too small, a thermoplastic resin may not be produced. If the amount of the chain transfer agent is too large, post-crosslinking may be difficult.

A thermoplastic resin can be manufactured by preparing the polymerizable composition (A) which contains the monomer solution 1 or the monomer solution 2 (hereafter may be collectively called "monomer solutions"), the metathesis polymerization catalyst, and the chain transfer agent, and polymerizing the composition (A) by bulk polymerization.

Although there are no specific limitations to the method of preparing the polymerizable composition (A), a method of separately preparing monomer solutions and a catalyst solution in which a metathesis polymerization catalyst is dissolved or dispersed in a suitable solvent, and combining the monomer solutions and catalyst solution immediately before polymerization can be given as an example. In this instance, the chain transfer agent may be added either to the monomer solutions or the catalyst solution, or may be added after the monomer solutions and the catalyst solutions are mixed. The crosslinking agent may be added to the catalyst solution without being included in the monomer solutions or may be added after norbornene monomers are mixed with the catalyst solutions.

Various additives, for example, a reinforcing material, modifier, antioxidant, flame retardant, filler, coloring agent, and light stabilizer can be added to the polymerizable composition (A). These additives may be dissolved or dispersed in the monomer solutions or the catalyst solutions beforehand.

As examples of the reinforcing material, glass fiber woven, glass fabric, paper substrate, and nonwoven glass fabric can be given. As examples of the modifier, elastomers such as natural rubber, polybutadiene, polyisoprene, styrene-butadiene copolymer (SBR), styrene-butadiene-styrene block copolymer (SBS), styrene-isoprene-styrene copolymer (SIS), ethylene-propylene-diene terpolymer (EPDM), ethylene-vinyl-acetate copolymer (EVA), and their hydrogenated products can be given. As examples of the antioxidant, various antioxidants for plastic rubbers of a hindered phenol-type, phosphorus-type, amine-type, and the like can be given. These antioxidants can be used either individually or in combination of two or more.

As the flame retardant, a phosphorus-containing flame retardant, nitrogen-containing flame retardant, halogen-containing flame retardant, metal hydroxide flame retardant such as an aluminum hydroxide, and the like can be given. These flame retardants can be used either individually or in combination of two or more.

As examples of the filler, inorganic fillers such as glass powder, carbon black, silica, talc, calcium carbonate, mica, alumina, titania, zirconia, mullite, cordierite, magnesia, clay, and barium sulfate and organic fillers such as wood powder and polyethylene powder can be given. If graphite powder, wood or bamboo charcoal powder, metal powder, and the like are used, conductivity and electromagnetic wave shielding properties can be increased. If powder of barium titanate, strontium titanate, lead titanate, magnesium titanate, bismuth titanate, lead zirconate, or the like is used, the relative dielectric constant can be increased. If a ferromagnetic metal powder, for example, ferrite such as Mn—Mg—Zn ferrite, Ni—Zn ferrite, or Mn—Zn ferrite; carbonyl iron, iron-silicon alloy, iron-aluminum-silicon alloy, iron-nickel alloy, or the like is used, the resulting product is provided with ferromagnetic properties. Fillers with the surface treated with a silane coupling agent or the like may be used.

As the coloring agent, dyes, pigments, and the like can be used. There are a great number of types of dyes. Any dye appropriately selected from among various types of known dyes can be used in the present invention. As examples of the pigment, carbon black, graphite, chrome yellow, iron oxide yellow, titania, zinc oxide, trilead tetraoxide, minium, chromium oxide, iron blue, and titanium black can be given. As examples of the light stabilizer, benzotriazole UV absorbers, benzophenone UV absorbers, salicylate UV absorbers, cyano acrylate UV absorbers, oxalinide UV absorbers, hindered amine UV absorbers, and benzoate UV absorbers can be given.

Although not specifically limited, the amount of these additives to be added is usually in the range of 0.001-500 parts by weight for 100 parts by weight of the thermoplastic resin.

As the method for producing the polymerizable composition (A) by bulk polymerization, (a) a method of pouring or applying the polymerizable composition (A) onto a supporting body and polymerizing the composition by bulk polymerization, (b) a method of polymerizing the polymerizable composition (A) in a mold, (c) a method of impregnating a textile material with the polymerizable composition (A) and polymerizing the composition by bulk polymerization, and the like can be given.

A thermoplastic resin film can be obtained if the method (a) is followed. As the supporting body used in this method, resins such as polyethylene terephthalate, polypropylene, polyethylene, polycarbonate, polyethylenenaphthalate, polyallylate, and nylon; metals such as iron, stainless steel, copper, aluminum, nickel, chromium, gold, and silver; and the like can be given. Although there are no specific limitations to the shape of the supporting body, a metal foil or a resin film is preferably used. The thickness of the metal foil or resin film is usually 1-150 µm, preferably 2-100 µm, and still more preferably 3-75 µm from the viewpoint of workability and the like.

There are no specific limitations to the method of applying the polymerizable composition (A) to the surface of the supporting body. A spray coating method, dip coating method, roll coating method, curtain coating method, die coating method, slit coating method, and the like can be given.

Although not specifically limited, as the method of heating the polymerizable composition (A) to a prescribed temperature, a method of heating the composition by placing the supporting body on a heating plate, a method of heating while applying pressure using a press machine (heat-press), a method of pressing using a heated roller, a method of using a furnace, and the like can be given.

The thickness of the thermoplastic resin film obtained in this manner is usually 15 mm or less, preferably 10 mm or less, and more preferably 5 mm or less.

A thermoplastic resin molded product can be obtained if the method (b) is followed. The shape of the molded product includes a sheet, film, column, cylinder, and multiangular prism, for example.

A commonly known mold, for example, a split mold having a core and cavity can be used by injecting the reaction fluid to the cavity and effecting the bulk polymerization therein. The core and cavity are fabricated so that a vacant space may be provided conforming to the shape of a desired molded product. There are no specific limitations to the shape, material, and size of the mold. A molded product of the thermoplastic resin in the form of a sheet or film can also be obtained by providing plate molds (e.g. glass boards or metal plates) and a spacer with a prescribed thickness, interposed between two sheets of plate molds, injecting the reaction fluid to the space formed by the two sheets of plate molds and the spacer, and effecting the bulk polymerization therein The filling pressure (injection pressure) for filling the reaction fluid in the cavity of the mold is usually 0.01-10 MPa, and preferably 0.02-5 MPa. If the filling pressure is too low, there is a tendency for the transfer surface formed in the inner surface of the cavity not to be transferred in a good order. Too high a filling pressure requires a highly rigid mold and is, therefore, uneconomical. The mold clamping pressure is usually within the range of 0.01-10 MPa.

The method (c) can produce a prepreg impregnated with a thermoplastic resin. The textile material used here is organic and/or inorganic fiber and includes, for example, known fibers such as glass fiber, carbon fiber, aramid fiber, polyethylene terephthalate fiber, vinylon fiber, polyester fiber, amide fiber, metal fiber, and ceramic fiber. These fibers can be used either individually or in combination of two or more. As the form of the textile material, a mat, cloth, nonwoven fabric, and the like can be given.

A textile material is impregnated with the polymerizable composition (A), for example, by a method comprising applying a prescribed amount of the polymerizable composition (A) to the textile material by a known method such as spray coating, dip coating, roll coating, curtain coating, die coating, or slit coating, layering a protective film over the coated polymerizable composition (A), as required, and pressing the resulting material using a roller or the like. After the textile material has been impregnated with the polymerizable composition (A), the resulting product (impregnated material) is heated to a prescribed temperature to polymerize the composition (A) by bulk polymerization, whereby a thermoplastic resin-impregnated prepreg can be obtained.

There are no specific limitations to the method of heating the impregnated material. For example, the above-mentioned method (a) can be applied, in which case the impregnated material placed on a supporting body may be heated. Alternatively, it is possible to impregnate the textile material which is placed in the mold in advance with the polymerizable composition (A), then follow the method (b) for bulk polymerization of the composition.

Since the polymerizable composition (A) has a low viscosity as compared with a conventional resin varnish, the composition can cause the textile material to be excellently impregnated therewith. The resulting prepreg thus contains the textile material homogeneously impregnated with the thermoplastic resin. Because the prepreg can be obtained by impregnating the textile material with the polymerizable composition (A), followed by heating for bulk polymerization, the manufacturing process does not require a step of removing a solvent from the impregnated resin varnish that was indispensable in the conventional process. The process therefore exhibits good productivity and is free from problems such as odor, blister, and the like due to a residual solvent. Furthermore, since the thermoplastic resin of the present invention is excellent in storage stability, the resulting prepreg is also excellent in storage stability.

In any of the above methods (a), (b), and (c), the heating temperature for polymerizing the polymerizable composition (A) is usually 50-200° C., and preferably 100-200° C. The polymerization time is usually 10 seconds to 20 minutes, and preferably within 5 minutes.

The polymerization reaction begins when the polymerizable composition (A) is heated to a predetermined temperature. This polymerization reaction is an exothermic reaction. Thus, once the bulk polymerization begins, the temperature of the reaction solution will rapidly increase and reach a peak temperature in a short time (for example, about 1 second to 5 minutes). If the temperature during the polymerization reaction is too high, the crosslinking reaction proceeds in addition to the polymerization reaction, thereby making it difficult to obtain the post-crosslinkable thermoplastic resin. Therefore, it is necessary to ensure that only the polymerization reaction proceeds and to inhibit the crosslinking reaction. Specifically, the peak temperature of bulk polymerization should be controlled usually to less than 230° C., and preferably less than 200° C.

When a radical generating agent is used as the crosslinking agent, it is preferable to control the peak temperature of the bulk polymerization to the one minute half-life temperature of the radical generating agent. The one minute half-life temperature here refers to the temperature at which one half of the radical generating agent decomposes in one minute. For example, the one minute half-life temperature of di-t-butylperoxide is 186° C. and that of 2,5-dimethyl-2,5-bis(t-butylperoxy)-3-hexine is 194° C.

To prevent overheating due to the heat of the polymerization reaction, it is possible to retard the reaction by adding a reaction retarder to the polymerizable composition (A).

As examples of the reaction retarder that can be used, chain 1,5-diene compounds such as 1,5-hexadiene, 2,5-dimethyl-1,5-hexadiene, (cis, cis)-2,6-octadiene, (cis, trans)-2,6-octadiene, (trans, trans)-2,6-octadiene; chain 1,3,5-triene compounds such as (trans)-1,3,5-hexatriene, (cis)-1,3,5-hexatriene, (trans)-2,5-dimethyl-1,3,5-hexatriene, (cis)-2,5-dimethyl-1,3,5-hexatriene; phosphines such as triphenyl phosphine, tri-n-butyl phosphine, and methyl diphenylphosphine; and Lewis bases such as aniline can be given.

Among the above-mentioned cycloolefin monomers, those having a 1,5-diene structure or 1,3,5-triene structure in the molecule functions as a reaction retarder. Examples of such cycloolefin monomers include monocyclic compounds such as 1,5-cyclooctadiene, 1,5-dimethyl-1,5-cyclooctadiene, 1,3,5-cycloheptatriene, (cis, trans, trans)-1,5,9-cyclododecatriene, 4-vinylcyclohexene, and dipentene; polycyclic compounds such as 5-vinyl-2-norbornene, 5-isopropenyl-2-norbornene, and 5-(1-propenyl)-2-norbornene; and the like.

When the reaction retarder is added, the amount is usually in the range of 0.001-5 wt %, and preferably 0.002-2 wt % of the monomer solutions. If the amount of the reaction retarder is less than 0.001 wt %, the reaction retarding effect is not exhibited. If the amount is more than 5 wt %, on the other hand, the product properties may be impaired due to the reaction retarder which remains in the polymer. There is also a possibility that the polymerization reaction may not sufficiently proceed.

The thermoplastic resin of the present invention is obtained by the manufacturing method of the present invention and is post-crosslinkable. The term "post-crosslinkable" herein refers to properties of a thermoplastic resin of being crosslinked when heated, melted, and continuously heated to produce a crosslinked resin.

Since the bulk polymerization has almost completely proceeded, the thermoplastic resin of the present invention contains only a small amount of unreacted monomers. In other words, since the polymerization reaction rate is high, the resin does not worsen the work environment due to an odor originating from monomers. The polymerization reaction rate of the thermoplastic resin of the present invention is usually 80% or more, more preferably 90% or more, and still more preferably 95% or more. The polymerization reaction rate of the thermoplastic resin can be determined by dissolving the thermoplastic resin in a solvent and analyzing the resulting solution using gas chromatography, for example.

Dissolution of the resin produced by bulk polymerization in a solvent can confirm that the resin is a thermoplastic resin. Specifically, a resin is a thermoplastic resin if dissolved in a solvent and a crosslinked resin if not dissolved in a solvent. As examples of the solvent, aromatic hydrocarbonses such as benzene and toluene; ethers such as diethyl ether and tetrahydrofuran; and halogenated hydrocarbons such as dichloromethane and chloroform can be given.

The thermoplastic resin of the present invention is not necessarily a post-crosslinkable thermoplastic resin in its entirety, but a partially crosslinked resin is acceptable. When a molded resin product with a certain thickness is produced from the thermoplastic resin by bulk polymerization, the polymerization reaction temperature is partially increased in the center of the molded product due to difficulty in releasing the heat of polymerization reaction from the center section. In such a case, the problem can be obviated if the thermoplastic resin is post-crosslinkable at least on the surface of the molded product.

Since the bulk polymerization has almost completely proceeded in the thermoplastic resin of the present invention, the bulk polymerization (metathesis ring-opening polymerization) does not proceed during storing of the thermoplastic resin. Even if the polymerizable composition (A) contains a crosslinking agent, the crosslinking reaction does not proceed unless the resin is heated. Since the surface hardness changes only with difficulty during preservation, such a thermoplastic resin possesses excellent storage stability. Particularly, when the polymerizable composition (A) contains a radical generating agent and a radical crosslinking retarder as the crosslinking agent, the thermoplastic resin obtained by bulk polymerization is excellent in storage stability.

2) Method for Manufacturing Crosslinked Resin

The method for manufacturing the crosslinked resin of the present invention is characterized by comprising a step of crosslinking the thermoplastic resin of the present invention. Specifically, the crosslinked resin can be obtained by melting and heating the thermoplastic resin of the present invention and continuing heating to effect the crosslinking reaction. The temperature for crosslinking the thermoplastic resin of the present is higher than the peak temperature of bulk polymerization preferably at least 20° C., usually 170-250° C., and more preferably 180-220° C. Although there are no specific limitations, the crosslinking time is usually from several minutes to several hours.

There are also no specific limitations to the method for crosslinking the thermoplastic resin insofar as the crosslinking operation comprises melting the thermoplastic resin. When the thermoplastic resin is molded in the form of a sheet or film, the sheets or films are preferably laminated and heat-pressed, if necessary. The pressure applied for press-heating is usually 0.5-20 MPa, and preferably 3-10 MPa. Excellent productivity of heat-press is attained by using a known pressing machine having a press frame mold for forming plates, a press-forming machine such as an SMC (sheet mold compound) or a BMC (bulk mold compound), and the like.

3) Method for Manufacturing Crosslinked Resin Composite Material

The method for manufacturing a crosslinked resin composite material of the present invention comprises a step of laminating the thermoplastic resin of the present invention on the substrate and crosslinking the thermoplastic resin portion.

As the substrate, metal foils such as a copper foil, aluminium foil, nickel foil, chromium foil, gold foil, and silver foil; a printed circuit board; films such as a conductive polymer film and other resin films; and the like can be given. When the thermoplastic resin was manufactured by the above method (a), the supporting body may be used as is as the substrate.

Although there are no specific limitations to the method of crosslinking the thermoplastic resin portion, a method of heat-pressing the thermoplastic resin laminated on the substrate is preferable for manufacturing the crosslinked resin composite material with sufficient productivity. The same heat-press conditions as mentioned for the manufacturing method of the crosslinked resin are applicable.

Because the thermoplastic resin of the present invention to be used is excellent in flowability and adhesion, a crosslinked resin composite material excelling in flatness, consisting of firmly adhered substrate and crosslinked resin, and exhibiting superior adhesiveness can be obtained by laminating the thermoplastic resin on the substrate and crosslinking the thermoplastic resin.

The method of manufacturing the crosslinked resin composite material of the present invention is suitable for producing a metal clad laminate using a metal foil, preferably a copper foil as the substrate. The thickness and surface roughness of the metal foil can be appropriately determined according to the purpose of application without any specific limitations. The surface of the metal foil may be treated with a silane coupling agent, a thiol coupling agent, a titanate coupling agent, or various types of adhesive, preferably with a silane coupling agent of the following formula (1) or a thiol coupling agent of the following formula (2).

$$RSiXYZ \tag{1}$$

$$T(SH)n \tag{2}$$

In the formula (1) for a silane coupling agent, R is a group having a double bond, a mercapto group, or an amino group at the terminal, X and Y individually represent a hydrolyzable group, a hydroxyl group, or an alkyl group, Z represents a hydrolyzable group or a hydroxyl group.

As specific examples of the silane coupling agent of the formula (1), allyltrimethoxysilane, 3-butenyltrimethoxysilane, styryltrimethoxysilane, N-β-(N-(vinylbenzyl)aminoethyl)-γ-aminopropyltrimethoxysilane and its salt, allyltrichlorosilane, allylmethyldichlorosilane, styryltrichlorosilane, vinyltrimethoxysilane, vinyltriethoxysilane, vinyltriacetoxysilane, vinyltris(2-methoxyethoxy)silane, vinyltrichlorosilane, β-methacryloxyethyltrimethoxysilane, β-methacryloxyethyltriethoxysilane, γ-methacryloxypropyltrimethoxysilane, δ-methacryloxybutyltrimethoxysilane, γ-acryloxypropyltrimethoxysilane, γ-mercaptopropyltrimethoxysilane, γ-mercaptopropylmethyldimethoxysilane, γ-aminopropyltrimethoxysilane, N-phenyl-γ-aminopropyltrimethoxysilane, N-β-(aminoethyl)-γ-aminopropyltrimethoxysilane, and the like can be given.

In the formula (2) for a thiol coupling agent, T represents an aromatic ring, an aliphatic ring, a heterocyclic, or an aliphatic chain, and n is an integer of 2 or more.

As examples of the thiol coupling agent, 2,4,6-trimercapto-1,3,5-triazole, 2,4-dimercapto-6-dibutylamino-1,3,5-triazine, 2,4-dimercapto-6-anilino-1,3,5-triazine, and the like can be given.

If the thermoplastic resin of the present invention is laminated with a metallic foil and heat-pressed, a thermoplastic resin portion is melted and is caused to adhere with a metallic foil, then the crosslinking reaction proceeds to obtain a crosslinked resin. A crosslinked resin-metal clad laminate in which the crosslinked resin and metal foil is firmly bonded can be obtained using the manufacturing method of the present invention. The peel-off strength of the metal foil from the resulting crosslinked resin-metal clad laminate measured according to JIS C6481 is preferably 0.8 kN/m or more, and more preferably 1.2 kN/m or more.

The method for manufacturing the crosslinked resin composite material of the present invention is also suitable for producing a multilayer printed circuit board using a printed circuit board as the substrate. Any known printed wiring boards commonly used for a circuit can be used without specific limitations as the printed circuit board. A multilayer printed circuit board can be manufactured by layering an outer layer material (e.g. one side copper clad laminate) and an inner layer material (e.g. both-side printed circuit board) via a prepreg and press-heating of the layered materials.

Since the crosslinked resin composite material obtained by the present invention consists of a crosslinked resin with excellent electric insulation property, mechanical strength, heat resistance, dielectric property, and the like, firmly adhered with a substrate with excellent adhesion, the material is suitable as an electric material.

A printed circuit board in which the crosslinked resin with excellent electric insulation property, mechanical strength, and adhesion, firmly adhered with a printed circuit board, can be efficiently manufactured by the present invention.

EXAMPLES

The present invention will now be described in detail by way of examples and comparative examples, which should not be construed as limiting the present invention. In the examples and comparative examples below "parts" and "%" are indicated on the weight basis, unless otherwise specified.

The strength for peeling a copper foil from a copper clad laminate, the flexural strength after peeling the copper foil, and the modulus of bending elasticity were measured according to JIS C6481.

Reference Example 1

Preparation of Catalyst Solution

A catalyst solution was prepared by dissolving 51 parts of benzylidene(1,3-dimesitylimidazolidin-2-ylidene)(tricyclohexylphosphine) ruthenium dichloride, and 79 parts of triphenylphosphine in 952 parts of toluene in a glass flask.

Example 1

A glass flask was charged with a monomer solution of 2,800 parts of tetracyclo[$6.2.1.1^{3,6}.0^{2,7}$]dodec-4-ene, 1,200 parts of 5-ethylidene-2-norbornene, and 6,000 parts of dicyclopentadiene, and 909 parts of styrene as a chain transfer agent. Then, 39 parts of the above catalyst solution was added with stirring to obtain a polymerizable composition a.

This composition a was instantaneously cured when injected onto an iron plate heated at 150° C. The cured product was immediately removed from the iron plate to obtain a polymer in the form of an odorless film. The film had a thickness of 0.1 mm and was soluble in toluene, indicating that the polymer was not crosslinked. The amount of residual monomers in a toluene solution of the film was measured using gas chromatography to confirm that the polymerization reaction rate was 98.9%.

After preserving the film for one week at room temperature in the air, the polymerization reaction rate was determined using the same method as above. The polymerization reaction rate was 98.9%, indicating that the reaction did not proceed after preparation of the film.

Example 2

The film obtained in Example 1 was placed on a plate heated at 200° C. Once melted on the plate, the film became non-flowable due to crosslinking. The resulting polymer was not dissolved in toluene, confirming that the polymer was crosslinked.

Comparative Example 1

A film was prepared in the same manner as in Example 1, except that styrene was not added. The resulting film was not dissolved in toluene.

It was confirmed from the results of Example 1 and Comparative Example 1 that a chain transfer agent such as styrene is required to obtain a post-crosslinkable thermoplastic resin.

Comparative Example 2

The experiment was carried out in the same manner as in comparative Example 1, except that the iron plated was heated to 60° C. and the polymer was cured for 20 minutes on the iron plate. The resulting film had an odor of monomers. In the same manner as in Example 1, the polymerization reaction rate was determined immediately after preparation of the film and after storing the film for one week to confirm that the polymerization reaction rate was 76% and 85%, respectively. It was thus found that the reaction proceeded during storing.

Comparative Example 3

The polymerizable composition a prepared in the same manner as in Example 1 was put into a glass flask. The glass flask was placed in a water bath at 50° C. to cure the composition. The internal temperature of the flask increased to 235° C. due to the heat of polymerization. The resulting polymer was not dissolved in toluene. The polymer was placed on a heated plate at 200° C. to confirm that the polymer did not melt.

The result indicated that if the polymer is overheated during the polymerization, a crosslinking reaction occurs and a thermoplastic resin cannot be obtained.

Example 3

A bottle made of polyethylene was charged with 45 parts of dicyclopentadiene, 5 parts of norbornene, 0.45 part of styrene, and 0.197 part of the catalyst solution obtained in Reference Example 1, in that order, while stirring to obtain a polymerizable composition b.

The composition b was sent to a metal mold under pressure. The metal mold is for fabrication of a flat board with a size of 2.2 mm×120 mm×120 mm, consisting of two sheets of chromium-plated iron boards equipped with a heater and a spacer with a shape of a Japanese character ko (コ) interposed between the boards. One side of the metal mold is heated to 68° C. and the other side to 50° C.

Two minutes after pressure filling the polymerizable composition b in the mold, the molded product was opened to remove the molded flat board. The flat board was cut into a disk with a diameter of 10 mm and the disk was dipped in toluene for one day to confirm that the surface was dissolved but the center portion along the thickness remained undissolved. The result indicates that crosslinking proceeded in the center of the flat board, while the surface remained without being crosslinked.

The flat board obtained was cut into an 87 mm×87 mm square. An electrolysis copper foil (Type GTS, thickness 0.018 mm, manufactured by Furukawa Circuit Foil Co., Ltd.) was layered on one side (the side on which the mold was heated to 68° C. during polymerization) of the square flat board using a rectangular mold for forming a flat board (size: 2 mm×90 mm×90 mm) and heat-pressed to obtain a one side copper clad laminate with a board thickness of 2 mm. The heat-press was carried out at a press temperature of 200° C. for 15 minutes under a pressure of 5 MPa.

The peel-off strength of the copper foil from the resulting copper clad laminate was 1.6 kN/m.

After measuring the copper foil peel-off strength, the resin portion after removing the copper foil was cut into a disk with a diameter of 10 mm. The disk was dipped in toluene for one day to confirm that no dissolution of the surface occurred, but the disk only swelled in its entirety.

The results indicate that the heat-press operation melted the resin surface, caused the resin to adhere to the copper foil, and the resin crosslinked thereafter.

Comparative Example 4

A flat board was prepared in the same manner as in Example 3, except that styrene was not added. The flat board obtained was cut into a disk with a diameter of 10 mm and the disk was dipped in toluene for one day. It was confirmed that no surface dissolution as that observed in Example 3 occurred, but the disk swelled in its entirety.

A one-side copper clad laminate with a board thickness of 2 mm was prepared in the same manner as in Example 3 using the above flat board. The copper foil peel-off strength of the copper foil from the resulting copper clad laminate was measured and found that the peel-off strength was 0.2 kN/m.

A crosslinked resin-copper clad laminate in which a copper foil and the crosslinked resin firmly bonded was obtained in Example 3. However, in Comparative Example 4 in which no chain transfer agent was added, thermoplasticity was not exhibited even on the surface. The crosslinked resin-copper clad laminate obtained by layering a copper foil and the resulting resin, followed by heat-press was found to exhibit only weak adhesion of the copper foil to the crosslinked resin.

Example 4

A polyethylene bottle was charged with a monomer solution of 38.5 parts of tetracyclo[6.2.1.1$^{3,6}$.0$^{2,7}$]dodec-4-ene and 18.5 parts of 5-ethylidene-2-norbornene, 0.39 part of styrene as a chain transfer agent, 0.51 part of di-t-butylperoxide (one minute half-life temperature: 186° C.) as a crosslinking agent, and 0.197 part of the above catalyst solution with stirring to obtain a polymerizable composition c.

A flat board was prepared from the composition c in the same manner as in Example 3. The flat board obtained was cut into a disk with a diameter of 10 mm and the disk was dipped in toluene for one day to confirm that the surface was dissolved but the center portion along the thickness remained without being dissolved. The result indicates that crosslinking proceeded in the center of the flat board, while the surface remained without being crosslinked.

The disc was chipped for a depth of 0.2 mm from the surface on both sides and the chipped material was dissolved in toluene. The amount of remaining unreacted monomers was measured by gas chromatography analysis to determined the rate of polymerization reaction, which was found to be 95%.

A one-side copper clad laminate with a board thickness of 2 mm was prepared in the same manner as in Example 3 using the flat board obtained. The peel-off strength of the copper foil from the resulting copper clad laminate was 1.2 kN/m.

After measuring the copper foil peel-off strength, the resin portion after removing the copper foil was cut into a disk with a diameter of 10 mm. The disk was dipped in toluene for one day to confirm that no dissolution of the surface occurred, while the disk only swelled in its entirety. The resin portion without the copper foil after measuring the copper foil peel-off strength was allowed to float in a solder bath at 260° C. for 20 seconds to confirm that neither gas generation nor deformation was seen.

The results indicate that the heat-press operation melted the resin surface, caused the resin to adhere to the copper foil, and the resin crosslinked thereafter to produce a crosslinked resin with high heat resistance.

Comparative Example 5

A flat board with a thickness of 2.2 mm was prepared in the same manner as in Example 4, except that di-t-butyl peroxide was not added. A one-side copper clad laminate with a board thickness of 2 mm was prepared in the same manner as in Example 4 using the flat board obtained. The peel-off strength of the copper foil from the one-side copper clad laminate was 1.1 kN/m.

After measuring the copper foil peel-off strength, the resin portion after removing the copper foil was cut into a disk with a diameter of 10 mm. The disk was dipped in toluene for one day to confirm that the disk was completely dissolved. The resin portion without the copper foil after measuring the copper foil peel-off strength was allowed to float in a plating bath at 260° C. for 20 seconds to confirm that the material melted and deformed, and that gas was generating from the surface. The above experiments confirmed that when a cycloolefin having two or more metathesis ring-opening reaction sites was not used and a crosslinking agent such as di-t-butyl peroxide was not added, a cross-linking reaction did not proceed even if the thermoplastic resin was heated and melted, thereby not obtaining a crosslinked resin. The copper clad laminate board obtained exhibited only poor heat resistance.

Comparative Example 6

A flat board with a thickness of 2.2 mm was prepared in the same manner as in Example 4, except that styrene was not added. The flat board obtained was cut into a disk with a diameter of 10 mm and the disk was dipped in toluene for one day. It was confirmed that surface dissolution as that observed in Example 4 did not occur, but the disk swelled in its entirety.

A one-side copper clad laminate with a board thickness of 2 mm was prepared in the same manner as in Example 4 using the above flat board. The peel-off strength of the copper foil from the one-side copper clad laminate board was 0.2 kN/m.

The results indicate that when no chain transfer agent such as styrene is added, a thermoplastic resin cannot be obtained and the resulting resin cannot allow a copper foil to melt and adhere thereto.

Example 5

A glass bottle was charged with 25 parts of tetracyclo[6.2.1.1$^{3,6}$.0$^{2,7}$]dodec-4-ene, 8 parts of tetracyclo[6.2.1.1$^{3,6}$.0$^{2,7}$]dodec-9-ene-4-carboxylic acid, 8.2 parts of brominated bisphenol A epoxy resin (epoxy equivalent: 420-480 g/eq, "AER8049" manufactured by Ciba Specialty Chemicals Co.), 4.9 parts of hydrogenated bisphenol A epoxy resin (epoxy equivalent: 210 g/eq, "EXA-7015" manufactured by Dainippon Ink and Chemicals, Inc.), and 0.2 part of styrene as a chain transfer agent. The mixture was heated and stirred in an oil bath at 80° C. to obtain a monomer mixture 1.

A stirrer was put into the glass bottle and 0.013 part of benzylidene (1,3-dimesitylimidazolidin-2-ylidene)(tricyclohexylphosphine)ruthenium dichloride and 0.00062 part of triphenylphosphine were added. After the addition of 0.013 part of toluene to dissolve the mixture, 3 parts of the monomer mixture 1 obtained above was added with vigorous stirring to obtain a polymerizable composition d, which was heated in a water bath at 60° C. After 47 seconds, mist generation due to polymerization heat was observed and the polymerization reaction was completed.

The resulting polymer did not dissolve in tetrahydrofuran indicating that the polymer was not crosslinked. A part of the polymer was dissolved in tetrahydrofuran to measure the amount of residual monomers using gas chromatography to confirm that the polymerization reaction rate was 91%. The polymer was gradually heated on a heater plate. It was confirmed that the polymer became fluid at 210° C., but when the temperature was increased, lost fluidity and became rubbery at 250° C.

Example 6

An eggplant flask was charged with 26 parts of 1,4-methano-1,4,4a,9a-tetrahydro-9H-fluorene, 4.2 parts of 5-norbornene-2,3-dicarboxylic acid anhydride, 5.2 parts of brominated bisphenol A epoxy resin (AER8049), 3.1 parts of hydrogenated bisphenol A epoxy resin (EXA-7015), and 0.18 part of styrene as a chain transfer agent. The mixture was heated and stirred in an oil bath at 80° C. to obtain a monomer mixture 2.

A stirrer was put into the glass bottle and 0.024 part of benzylidene (1,3-dimesitylimidazolidin-2-ylidene)(tricyclohexylphosphine)ruthenium dichloride and 0.0037 part oftriphenylphosphine were added. After the addition of 0.013 part of toluene to obtain a homogeneous solution, 3 parts of the monomer mixture 2 obtained above was added with vigorous stirring to obtain a polymerizable composition e, which was heated in a water bath at 70° C. After 47 seconds, mist generation due to polymerization heat was observed and the polymerization reaction was completed.

The resulting polymer was dissolved in chloroform indicating that the polymer was thermoplastic (not crosslinked). The amount of residual monomers in the polymer solution was measured by gas chromatography to confirm that the reaction rate of norbornene monomers (1,4-methano-1,4,4a, 9a-tetrahydro-9H-fluorene and 5-norbornene-2,3-dicarboxylic acid anhydride) was 98%. The polymer was gradually heated on a heater plate. It was confirmed that the polymer became fluid at 170° C., but when the temperature was increased, lost fluidity and became rubbery at 230° C.

Example 7

A polyethylene bottle was charged with 0.2089 part of 3,5-di-t-butylhydroxyanisol, 22.5 parts of tetracyclo[6.2.1.1$^{3,6}$.0$^{2,7}$]dodec-4-ene, 7.5 parts of 2-norbornene, 0.69 part of allyl methacrylate, 0.443 part of di-t-butylperoxide (one minute half-life temperature: 186° C.), and 0.11 part of the catalyst solution prepared in Reference Example 1 with stirring to obtain a polymerizable composition f.

Three sheets of glass cloth (each sheet cut into a size of 200 mm×200 mm, thickness: 0.092 mm, Product #2116/350/AS891AW, manufactured by Asahi-Schwebel Co., Ltd.) were placed on a glass fiber-reinforced polytetrafluoroethylene resin (PTFE resin) film (300 mm×300 mm×0.08 mm, Product #5310, manufactured by Saint-Gobain K. K.). About half an amount of the polymerizable composition f was poured onto the glass cloth, which was then covered with another glass fiber-reinforced PTFE resin film, followed by pressing with a roller to cause the glass cloth sheets to be impregnated with the composition.

Each side of the glass fiber-reinforced PTFE resin film was attached to an aluminum plate heated at 145° C. for one minute to polymerize the polymerizable composition f. Thereafter, the glass fiber-reinforced PTFE resin films were removed from both sides to obtain a prepreg.

A part of the prepreg was put into a platinum crucible and the resin portion was burnt in an electric furnace. The glass content determined from the glass weight of the unburnt portion was 58%. A part of the prepreg was dipped into toluene to dissolve the resin portion. The amount of residual monomers in the solution was determined by gas chromatography. Based on the resulting amount of residual monomers and the glass content, the polymerization reaction rate was calculated to be 97%.

0.05 part of acetic acid was added to 60 parts of distilled water. After the addition of 0.18 part of vinyl tris(2-methoxyethoxy)silane ("A-172" manufactured by Nippon Unicar Co., Ltd.), the mixture was stirred for 10 minutes to hydrolyze and dissolve the vinyl tris(2-methoxyethoxy)silane, thereby obtaining a silane coupling agent solution. Using absorbent cotton impregnated with the silane coupling agent solution, the silane coupling agent solution was applied to a rough surface of an electrolysis copper foil (GTS-treated rough surface, thickness: 0.018 mm, manufactured by Furukawa Circuit Foil Co., Ltd.) and dried for one hour at 130° C. under nitrogen atmosphere.

Three sheets of prepreg (each cut into a size of 87 mm×87 mm) were inserted in a square frame (inner size: 90 mm×90 mm, thickness: 1 mm). A copper foil (cut into a size of 115 mm×115 mm) treated with the silane coupling agent was attached to the top and bottom of the rough surfaces of the prepreg sheet, followed by heat-pressing for 15 minutes at 4.1 MPa and 200° C. After cooling to 100° C. or less while applying the pressure, the sample was removed to obtain a both-side copper clad laminate.

The peel-off strength of the copper foil from the resulting both-side copper clad laminate was measured and found that the peel-off strength was 1.6 kN/m. The solder heat resistance test was carried out in a solder bath at 260° C. for 20 seconds to confirm that no swelling was observed.

After removing the copper foil, the bending test of the fiber-reinforced resin portion (thickness: 1.5 mm) was carried out to find that the bending modulus of elasticity was 12 GPa and the bending strength was 385 MPa. The dielectric constant and dielectric loss tangent were measured using an impedance analyzer ("E4991" manufactured by Agilent Technologies) to find that dielectric constant and dielectric loss tangent were respectively 3.5 and 0.0013 at 100 MHz and 3.5 and 0.0022 at 13.1 GHz.

Example 8

A polyethylene bottle was charged with 0.6 part of fumed silica ("AEROSIL 200" manufactured by AEROSIL Japan Inc.), 22.5 parts of tetracyclo[6.2.1.1$^{3,6}$.0$^{2,7}$]dodec-4-ene, 7.5 parts of 2-norbornene, 1.0 part of styryl methacrylate, 0.36 part of 2,5-dimethyl-2,5-bis(t-butylperoxy)-3-hexine (one minute half-life temperature: 194° C.), and 0.11 part of the catalyst solution prepared in Reference Example 1 with stirring to obtain a polymerizable composition g.

0.05 part of acetic acid was added to 60 parts of distilled water. After the addition of 0.18 part of styryl trimethoxysilane ("KEM-1403" manufactured by Shin-Etsu Chemical Co., Ltd.), the mixture was stirred for one hour to hydrolyze and dissolve the styryl trimethoxysilane, thereby obtaining a silane coupling agent solution. Using absorbent cotton impregnated with the silane coupling agent solution, the silane coupling agent solution was applied to a rough surface of an electrolysis copper foil (the same copper foil as used in Example 7) and dried for one hour at 130° C. under nitrogen atmosphere.

The polymerizable composition g was applied to the rough surface of the above electrolysis copper foil (cut into 220 mm×220 mm) using a coating roller. The coated surface was covered with a glass-fiber reinforced PTFE resin film (the same film as used in Example 7). The copper foil side was attached for one minute to an aluminum plate heated to 145° C. to polymerize the composition. Thereafter, the glass fiber-reinforced PTFE resin film was removed to obtain a resin-attached copper foil.

A part of the resin-attached copper foil was dipped into toluene to dissolve the resin portion. The amount of residual monomers in the solution was determined by gas chromatography. Based on the resulting amount of residual monomers and the weight of the remaining copper foil, the polymerization reaction rate was calculated to be 97%.

The resin-attached copper foil was attached to both sides of a glass epoxy both-side copper clad laminate (thickness: 1 mm, size 80 mm×80 mm) microetched using a surface roughener CZ-8100 (MEC Co., Ltd.), with the resin being on the inner side, and the resulting material was heat-pressed at 5.2 MPa and 200° C. for 15 minutes. After cooling to 100° C. or less while applying the pressure, the sample was removed to obtain a multilayer copper clad laminate.

The peel-off strength of the bottom side copper foil from the resulting multilayer copper clad laminate was measured and found that the peel-off strength was 1.6 kN/m. The surface resin after removing the copper foil was subjected to the peel-off adhesion test according JIS K5400 to determine adhesion between the resin surface and the inner side copper foil. As a result, there was no peel-off.

Copper was removed from a both-side copper clad laminate prepared in the same manner as in Example 7 by etching using an aqueous solution of ammonium persulfate (thickness: 1.4 mm, size 80 mm×80 mm) and the above resin-attached copper foil was attached to both sides of the copper-free laminate board, with the resin being on the inner side, and the resulting material was heat-pressed at 5.2 MPa and 200° C. for 15 minutes. After cooling to 100° C. or less while applying pressure, the sample was removed to obtain a both side copper clad laminate.

The peel-off strength of the top side copper foil from the resulting both-side copper clad laminate was measured and found that the peel-off strength was 1.6 kN/m. The surface resin after removing the copper foil was subjected to the peel-off adhesion test according JIS K5400 to determine adhesion between the resin surface and the inner side copper foil. As a result, there was no peel-off.

Example 9

A polyethylene bottle was charged with 0.6 part of fumed silica ("AEROSIL 200"), 12 parts of tetracyclo[6.2.1.1$^{3,6}$.0$^{2,7}$]dodec-4-ene, 5.4 parts of 2-norbornene, 12 parts of dicyclopentadiene, 0.36 part of styrene, and 0.34 part of di-t-butylperoxide. 0.11 part of the catalyst solution prepared in Reference Example 1 was added with stirring to obtain a polymerizable composition h.

The polymerizable composition h was applied to the upper surface of a glass-fiber reinforced PTFE resin film (the same film as used in Example 7) using a coating roller. The coated surface was covered with another glass-fiber reinforced PTFE resin film. The copper foil side was attached for one minute to an aluminum plate heated to 145° C. to polymerize the composition. Thereafter, the glass fiber-reinforced PTFE resin film was removed to obtain a resin film.

A part of the film was dipped into toluene to dissolve the resin portion. The amount of residual monomers in the solution was determined by gas chromatography. Based on the resulting amount of residual monomers, the polymerization reaction rate was calculated to be 98%.

A both-side copper clad laminate with a crosslinked resin adhering thereto was prepared in the same manner as in Example 8, except for using the resin film obtained above. The peel-off adhesion test according JIS K5400 was carried out on the surface of the resin layer. As a result, there was no peel-off.

Examples 10-15

Experiments were carried out in the same manner as in Example 7 using the silane coupling agents shown in Table 1. The results of the peel-off strength of the copper foil from the resulting both-side copper clad laminate are shown in Table 1. In Examples 12 and 15, the silane coupling agent solutions prepared without using acetic acid were used.

Example 16

The same experiment as in Example 7 was carried out, except for using a 0.3% tetrahydrofuran solution of 2,4,6-trimercapto-1,3,5-triazine instead of the silane coupling agent solution. The results of the peel-off strength of the copper foil from the resulting both-side copper clad laminate are shown in Table 1.

| Example | Coupling agent | Copper foil peel-off strength (kN/m) |
|---|---|---|
| 7 | vinyltris(2-methoxyethoxy)silane | 1.5 |
| 10 | Allyltrimethoxysilane | 1.6 |
| 11 | styryl trimethoxysilane | 1.5 |
| 12 | N-β-(N-(vinylbenzyl)aminoethyl)-γ-aminopropyltrimethoxysilane hydrochloride | 1.5 |
| 13 | δ-methacryloxybutyltrimethoxysilane | 1.5 |
| 14 | γ-mercaptopropyltrimethoxysilane | 0.9 |
| 15 | N-β-(aminoethyl)-γ-aminopropyltrimethoxysilane | 0.6 |
| 16 | 2,4,6-trimercapto-1,3,5-triazine | 1.3 |

Examples 17-19

Experiments for 17 to 19 were carried out in the same manner as in Example 11, except for using styryl methacrylate (Example 17), 1-octene (Examples 18), or styrene (Examples 19) instead of allyl methacrylate as a chain transfer agent. The copper foil peel-off strength was respectively 1.5 kN/m, 1.1 kN/m, and 1.1 kN/m. The results indicate that the use of a chain transfer agent having a methacryloyl group increases the adhesion force of the copper foil with the resin.

INDUSTRIAL APPLICABILITY

According to the present invention, a thermoplastic resin free from an odor of remaining monomers and excelling in storage stability can be obtained efficiently by a simple method of polymerizing a polymerizable composition (A) comprising (I) a cycloolefin (α) or a monomer solution containing a norbornene monomer and a crosslinking agent, (II) a metathesis polymerization catalyst, and a chain transfer agent (III) by bulk polymerization. Since the methods of manufacturing the crosslinked resin and the crosslinked resin composite material of the present invention are simple and can continuously manufacture the products, the methods are industrially advantageous. The crosslinked resin obtained by the present invention is excellent in electric insulation property, mechanical strength, heat resistance, dielectric property, and the like. According to the present invention, a crosslinked resin composite material, wherein the composite material is obtained by laminating the thermoplastic resin of the present invention on a substrate and crosslinking the thermoplastic resin, excels in adhesion between the crosslinked resin and substrate, and is useful as an electrical material and the like.

The invention claimed is:

1. A method for manufacturing a post-crosslinkable thermoplastic resin comprising polymerizing a polymerizable composition (A) which comprises a monomer solution containing 10 wt % or more, based on the total amount of monomers, of a cycloolefin ($\alpha$) which has two or more metathesis ring-opening reaction sites in the molecule, a metathesis polymerization catalyst, and a chain transfer agent by bulk polymerization, wherein the maximum temperature during the bulk polymerization is less than 230° C., and wherein the thermoplastic resin is (i) molded into a film by polymerizing the polymerizable composition (A) on a supporting body by the bulk polymerization, or (ii) molded into a prescribed form by polymerizing the polymerizable composition (A) in a mold by the bulk polymerization, or (iii) obtained by impregnating a textile material with the polymerizable composition (A) and polymerizing the polymerizable composition (A) by bulk polymerization.

2. The method according to claim 1, wherein the polymerization conversion ratio is 80% or more.

3. The method according to claim 1, wherein the chain transfer agent is a compound represented by the formula $CH_2=CH-Q$, wherein Q is a group which has at least one group selected from the group consisting of a methacryloyl group, acryloyl group, vinyl silyl group, epoxy group and amino group.

4. The method according to claim 1, wherein the cycloolefin ($\alpha$) is dicyclopentadiene.

5. The method according to claim 1, wherein the polymerizable composition (A) further comprises a radical crosslinking retarder.

6. A post-crosslinkable thermoplastic resin produced by the method according to claim 1.

7. A method for producing a crosslinked thermoplastic resin comprising crosslinking the thermoplastic resin according to claim 6.

8. A method for producing a crosslinked resin composite material comprising a step of laminating the thermoplastic resin according to claim 6 on a substrate and crosslinking the thermoplastic resin portion.

9. The method according to claim 8, wherein the substrate is a metal foil.

10. The method according to claim 9, wherein the metal foil is previously treated with a silane coupling agent of the following formula (1) or a thiol coupling agent of the following formula (2), $RSiXYZ$ (1) $T(SH)n$ (2) wherein R is a group having a double bond, a mercapto group, or an amino group at the terminal, X and Y individually represent a hydrolysable group, a hydroxyl group, or an alkyl group, Z represents a hydrolysable group or a hydroxyl group, T represents an aromatic ring, an aliphatic ring, a heterocyclic, or an aliphatic chain, and n is an integer of 2 or more.

11. The method according to claim 8, wherein the substrate is a printed circuit board.

12. The method of claim 1, wherein the cycloolefin ($\alpha$) has two or more metathesis ring-opening reaction sites in different ring structures of the molecule, respectively.

13. The method of claim 1, wherein after bulk polymerization of cycloolefin ($\alpha$), there is at least one metathesis ring-opening reaction site remaining in the post-crosslinkable thermoplastic resin.

14. The method of claim 1, wherein the polymerization time for polymerization of the polymerizable composition (A) is 10 seconds to 20 minutes.

15. The method of claim 1, wherein a heating temperature for polymerizing the polymerizable composition (A) is 50 to 200° C. and the polymerization time is 10 seconds to 20 minutes.

16. The method of claim 1, wherein said cycloolefin ($\alpha$) is a compound selected from the group consisting of pentacyclo[$6.5.1.1^{3,6}.0^{2,7}.0^{9,13}$]pentadeca-4,10-diene, pentacyclo[$9.2.1.1^{4,7}.0^{2,10}.0^{3,8}$]pentadeca-5,12-diene, dicyclopentadiene, tetracyclo[$6.2.1.1^{3,6}.0^{2,7}$]dodeca-4,9-diene, tricyclo[$12.2.1.0^{2,13}$]heptadeca-5,9,15-triene, tetracyclo[$9.2.1.0^{2,10}.0^{4,8}$]tetradeca-5,12-diene, pentacyclo[$9.2.1.1^{3,9}.0^{2,10}.0^{4,8}$]pentadeca-5,12-diene, norbornadiene, bicyclo[6.2.0]deca-4,9-diene, bicyclo[6.3.0]undeca-4,9-diene, tricyclo[$8.2.1.0^{2,9}$]trideca-5,11-diene, 9-cyclohexenyltetracyclo[$6.2.1.1^{3,6}.0^{2,7}$]dodec-4-ene, 9-cyclopentenyltetracyclo[$6.2.1.1^{3,6}.0^{2,7}$]dodec-4-ene, 5-cyclohexenyl-2-norbornene, 5-cyclopentenyl-2-norbornene, 5,5'-bi-(2-norbornene), 5-cyclooctenyl-2-norbornene, 5-norbornene-2-carboxylate-3-cyclopenten-1-yl, 5-norbornene-2-carboxylate-5-norbornen-2-yl, and compounds having at least one substituent at any site of the foregoing compounds, the substituents being selected from the group consisting of alkyl groups, alkylidene groups, aromatic hydrocarbon groups, carboxyl group, alkoxycarbonyl groups, acid anhydride groups, and cyano groups.

17. The method according to claim 1, wherein the supporting body is a metal foil or a resin film.

* * * * *